(12) United States Patent
Mazurek et al.

(10) Patent No.: US 11,702,149 B2
(45) Date of Patent: Jul. 18, 2023

(54) FALL PROTECTION SYSTEM AND METHODS FOR USING SAME

(71) Applicant: Canopy Safety Brands LLC, Concord, NC (US)

(72) Inventors: Paul Mazurek, Peachtree Corners, GA (US); Tom Borst, Peachtree Corners, GA (US); Lee Farris, Atlanta, GA (US); Corey Vaughan, Atlanta, GA (US)

(73) Assignee: Canopy Safety Brands LLC, Concord, NC (US)

( * ) Notice: Subject to any disclaimer, the term of this patent is extended or adjusted under 35 U.S.C. 154(b) by 158 days.

(21) Appl. No.: 17/204,733

(22) Filed: Mar. 17, 2021

(65) Prior Publication Data

US 2021/0291915 A1    Sep. 23, 2021

Related U.S. Application Data

(60) Provisional application No. 62/990,786, filed on Mar. 17, 2020.

(51) Int. Cl.
*B62D 33/08*    (2006.01)
*B62D 33/027*    (2006.01)
*B62D 33/02*    (2006.01)

(52) U.S. Cl.
CPC ......... *B62D 33/08* (2013.01); *B62D 33/0207* (2013.01); *B62D 33/027* (2013.01); *B62D 33/0222* (2013.01)

(58) Field of Classification Search
CPC ............... B62D 33/08; B62D 33/0207; B62D 33/0222; B62D 33/027; B62D 25/00; B62D 65/02; E04G 5/142; E04G 5/041; E04G 5/043; E04G 21/3214; E04G 21/3223; B60R 3/005; E04H 17/02
USPC .................................. 296/203.01; 256/65.14
See application file for complete search history.

(56) References Cited

U.S. PATENT DOCUMENTS

| | | | |
|---|---|---|---|
| 6,053,281 A | 4/2000 | Murray | |
| 6,857,677 B1 | 2/2005 | Giles et al. | |
| 9,573,629 B2 * | 2/2017 | Conny | B62D 33/0207 |
| 9,731,640 B1 * | 8/2017 | Meacham | B60R 3/005 |
| 10,022,572 B2 * | 7/2018 | Wolter | A62B 35/0056 |

(Continued)

FOREIGN PATENT DOCUMENTS

| | | | |
|---|---|---|---|
| CA | 2923550 A1 | 10/2016 | |
| GB | 2464469 A * | 4/2010 | B62D 33/0207 |

(Continued)

*Primary Examiner* — Joseph D. Pape
*Assistant Examiner* — Veronica M Shull
(74) *Attorney, Agent, or Firm* — Bekiares Eliezer LLP

(57) ABSTRACT

Disclosed herein is a modular safety rail and system for a flatbed platform, comprising first and second end post assemblies defining first and second ends of the safety rail; at least one intermediate post, each intermediate post comprising a first cable holder and a second cable holder; a cable configured to connect with the first end post assembly and the second end post assembly and configured to be removably positioned within and pass through the first cable holder and second cable holder of each intermediate post; and a cable winch connected to a first end of the cable and configured to spool and unspool the cable. Also disclosed herein are kits and methods for using the disclosed safety rail and system.

19 Claims, 14 Drawing Sheets

(56) References Cited

U.S. PATENT DOCUMENTS

2012/0193168 A1     8/2012   Taylor et al.
2019/0389387 A1*   12/2019   Erickson ................ B60R 3/005

FOREIGN PATENT DOCUMENTS

| JP | 2013099385 A | 5/2013 |
| JP | 2014039740 A | 3/2014 |
| JP | 2017012416 A | 1/2017 |

* cited by examiner

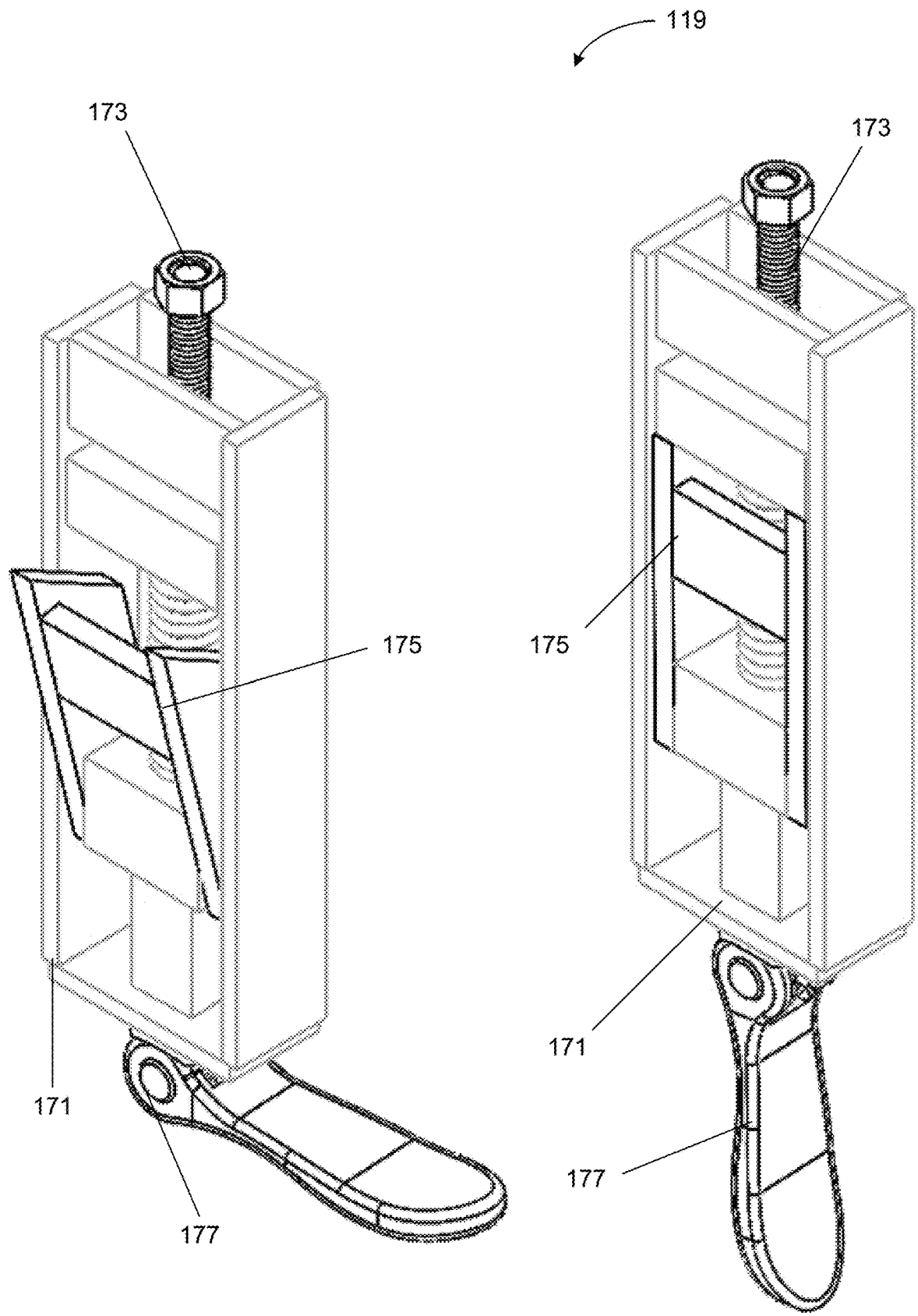
*FIG. 10A*  *FIG. 10B*

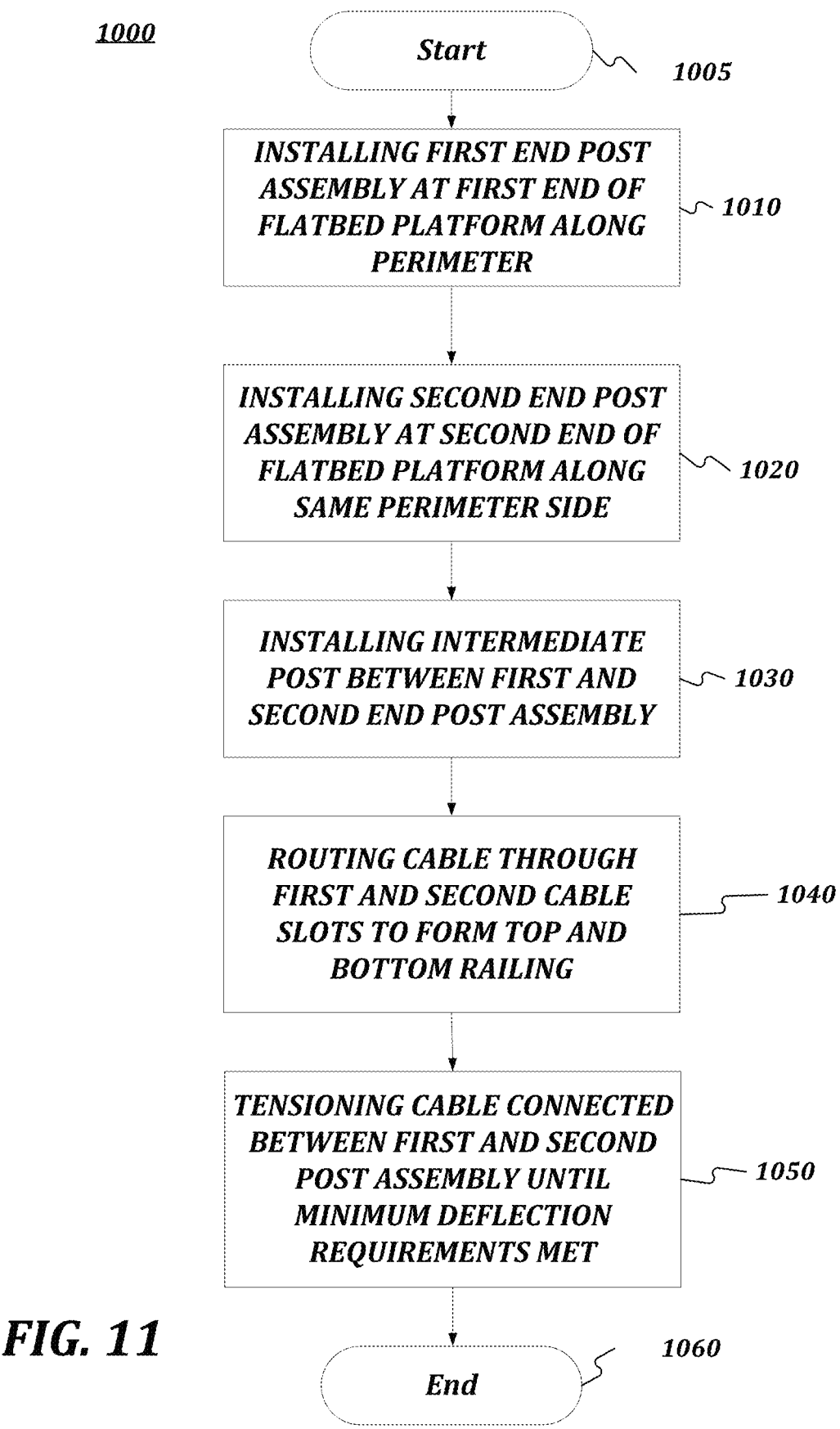

FALL PROTECTION SYSTEM AND METHODS FOR USING SAME

RELATED APPLICATION

The present application claims benefit under the provisions of 35 U.S.C. § 119(e) of U.S. Provisional Application No. 62/990,786 filed Mar. 17, 2020, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF INVENTION

The present invention relates to safety rails and systems, and methods for providing fall protection from an elevated flatbed platform, such as a truck flatbed or flatbed trailer.

BACKGROUND OF THE INVENTION

Numerous falls occur each year from the back of flatbed truck trailers and platform body straight trucks. The Occupational Safety and Health Administration (OSHA) fall protection regulations require that workers be protected from falls that could occur when vertical distances of 4 feet or more exist between work surfaces. Many flatbed trailers and platform body straight trucks create this fall hazard due to their height from the road/ground and lack of built-in fall protection system in place. While some types of fall protection do exist in the form of rolling rail stages, mobile overhead fall arrest anchor points, and bulky metal rail sections, these fall protection systems are expensive, unwieldy, and heavy. Because of these shortcoming, current options are infrequently used and mostly suited for use at commercial loading or unloading locations such as loading docks. Further, no current system is sufficiently lightweight and can be deployed and removed conveniently to accommodate the side loading/unloading process, while also being able to remain in place to protect workers and travel with the trailer/truck to the destinations required.

Accordingly, there remains a need for an improved safety rail for flatbed platforms such as flatbed trailers and platform trucks that easily allow an individual worker to install, deploy, and remove for unloading. Such a safety rail would preferably be modular to fit flatbeds of varying sizes and load configurations, and capable of remaining deployed while traveling on the road. This need and other needs are satisfied by the various aspects of the present disclosure.

SUMMARY OF THE INVENTION

In accordance with the purposes of the invention, as embodied and broadly described herein, the invention, in one aspect, relates to a modular safety rail and system, and methods for providing fall protection from an elevated flatbed platform. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In an exemplary aspect, the invention relates to a modular safety rail for a flatbed platform, comprising first and second end post assemblies defining first and second ends of the safety rail; at least one intermediate post, each intermediate post comprising a first cable holder and a second cable holder; a cable configured to connect with the first end post assembly and the second end post assembly and configured to be removably positioned within and pass through the first cable holder and second cable holder of each intermediate post; and a cable winch connected to a first end of the cable and configured to tension, spool and unspool the cable.

In another exemplary aspect, the invention relates to a system for providing fall protection, the system including a modular safety rail comprising a first end post assembly defining a first end of the safety rail; a second end post assembly defining a second end of the safety rail; at least one intermediate post, each intermediate post comprising a first cable holder and a second cable holder; a cable configured to connect with the first end post assembly and the second end post assembly and configured to be removably positioned within and pass through the first cable holder and second cable holder of each intermediate post; a cable winch connected to the second end post assembly and configured to spool and unspool the cable; and a cable tension mechanism connected to the second end post assembly and configured to couple with one end of the cable, the cable tension mechanism including a visual indicator configured to show if one or more predetermined cable tension criteria is met.

In further aspects, each of the first end post assembly, second end post assembly, and intermediate posts may be configured to be removably inserted into one or more stake pockets along a perimeter of the flatbed platform.

In further aspects, the invention also relates to additional methods for using the disclosed safety rails and systems, and kits comprising the disclosed safety rails and systems.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate several aspects of the invention and together with the description, serve to explain the principles of the invention. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIGS. 10A-10B show depictions of an attachable post securing mechanism in accordance with an exemplary embodiment of the present disclosure.

FIG. 11 is a flow chart of a method for providing fall protection using a disclosed safety rail system in accordance with an exemplary embodiment of the present disclosure.

DETAILED DESCRIPTION OF THE INVENTION

Figure 1:
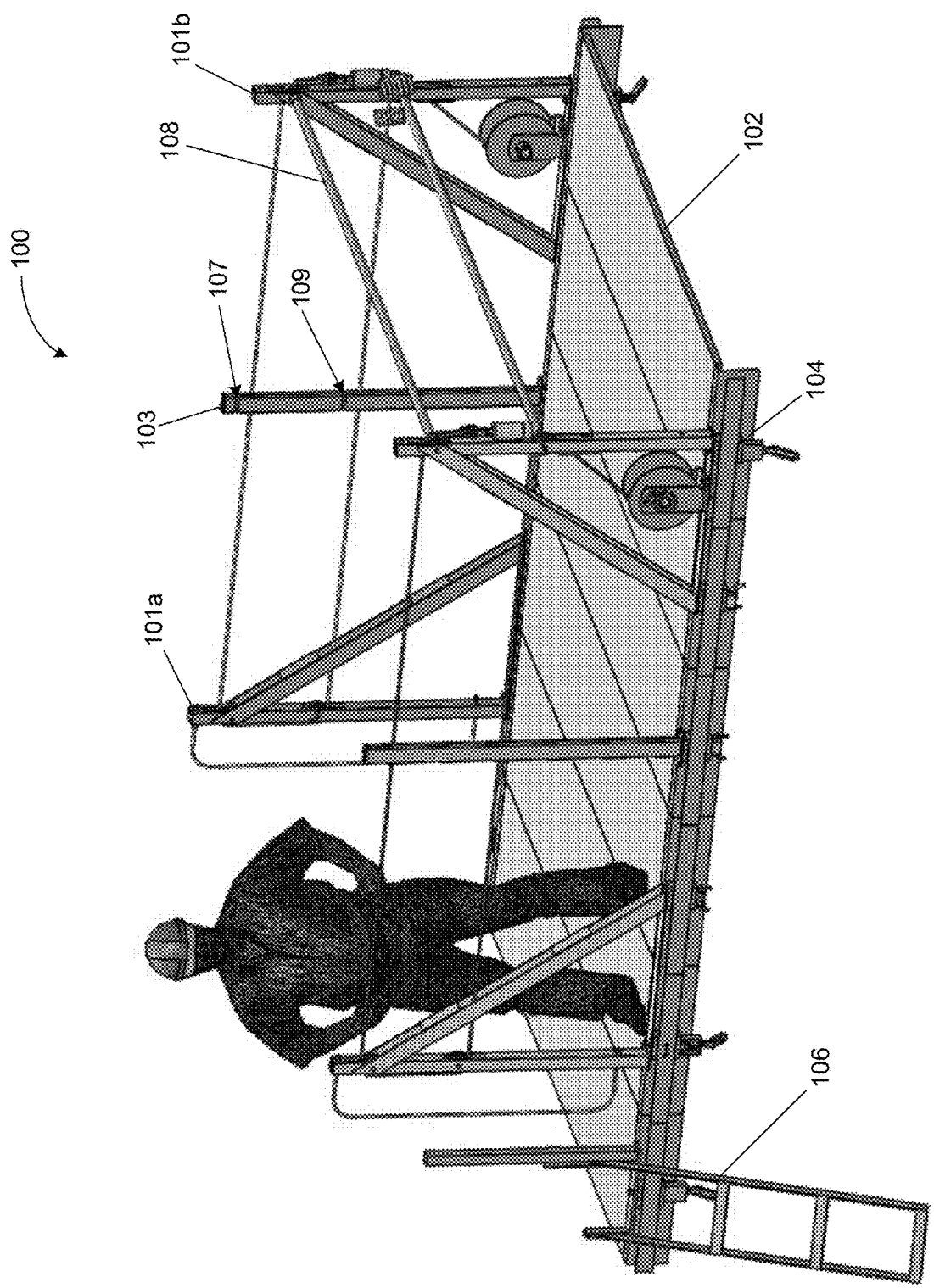
FIG. 1 shows a depiction of a modular safety rail system in an operating environment in accordance with an exemplary embodiment of the present disclosure.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "a leg" includes two or more legs.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the materials, components, parts, and/or elements to be used to manufacture the disclosed devices and systems of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. System Overview

As briefly described above, the present disclosure provides, in various aspects, a safety rail and system for providing fall protection from elevated flatbed platforms. This overview is provided to introduce a selection of concepts in a simplified form that are further described below. This overview is not intended to identify key features or essential features of the claimed subject matter. Nor is this overview intended to be used to limit the claimed subject matter's scope.

In one aspect, the disclosed safety rail and system can provide a convenient and lightweight system that can be capable of traveling while deployed on a flatbed trailer or truck to provide fall protection during loading, unloading, and at stops between point of origin and destination. The safety rail and system can be easily installed and deployed by a single worker along the outside of one or more sides of a flatbed trailer or truck using existing post hardware commonly found on flatbed trailers or trucks.

Some existing safety rail systems for flatbed trailers include posts that can be deployed and retracted, however these systems require proprietary tracks to be permanently mounted for the deployment and retraction functionality. Other safety rail systems claim to provide portable systems wherein all the posts are connected and configured to be stowed into a single housing that can be removed from the flatbed trailer. While these systems may claim to be portable, they are specifically designed for full size tractor trailers and require a large number of posts in order to extend the entire length of the tractor trailer flatbed. As one can imagine, the resulting weight of a single housing containing all the system components and rails for a full-size tractor trailer can make it unrealistic for every worker to be able to install or move the housing from one trailer to another. In addition to the weight, these system types do not provide the option to carry only the number posts appropriate for a short flatbed or a smaller load.

The disclosed safety rail and system is both portable and modular, such that a worker need only carry and install the exact number of intermediate posts corresponding to the size and configuration of the load. The portability and modularity of the system enables use in a number of different load configurations and settings. For example, if the system is mounted to the flatbed trailer using two or more intermediate posts, then one or more intermediate posts may be removed/added when part of the load is dropped off or reconfigured on the flatbed. The disclosed system can combine modular flexibility with the highest level of "uptime" for fall protection of any similar system. To this end, the level of uptime is important as drivers or workers may often need to inspect freight, tarps, and other matters during transit, requiring fall protection to be in place while these activities occur on the flatbed of the truck or trailer. The disclosed safety rail and system generally comprises a plurality of end posts and one or more detachable intermediate posts that carry cable or rope between the end posts. The cable functions as railings that can satisfy OSHA's requirements for a safe fall protection railing system when deployed and tensioned.

In one aspect, the present disclosure provides a safety rail for a flatbed platform, comprising: a first end post assembly defining a first end of the safety rail; a second end post assembly defining a second end of the safety rail; at least one intermediate post, each intermediate post comprising a first cable holder and a second cable holder; a cable configured to connect with the first end post assembly and the second end post assembly and configured to be removably positioned within and pass through the first cable holder and second cable holder of each intermediate post; and a cable winch connected to a first end of the cable and configured to tension, spool and unspool the cable. In further aspects, each first end post assembly, second end post assembly, and intermediate post may be configured to be removably inserted into one or more mounting pockets defined along a perimeter of the flatbed platform.

In further aspects, the first end post assembly, second end post assembly, and intermediate post may comprise at least one vertical post member having first and second opposed ends. In still further aspects, the first and/or second end post assembly may comprise at least one of: a vertical member having first and second opposed ends, a cross member having first and second opposed ends, or a base member having first and second opposed ends, or a combination thereof. In yet further aspects, the first end post assembly may comprise at least one vertical member, cross member, and base member. In even further aspects, the intermediate post may comprise at least one vertical member having first and second opposed ends. In some aspects, the member can comprise a tubular member. In other aspects, the member can comprise a flat member.

In further aspects, the first end post assembly, second end post assembly, and intermediate post may be configured to be removably inserted into the one or more mounting pockets of the modular flatbed platform. In still further aspects, a portion of the first end post assembly and/or second end post assembly may be configured to be removably inserted into the one or more mounting pockets. In yet further aspects, the first end post assembly and/or second end post assembly may comprise at least one foot configured to be removably inserted into the one or more mounting pockets. In some aspects, the first end post assembly and/or second end post assembly may comprise a plurality of feet. In other aspects, the foot may be configured to be adjustably positioned, such as, for example along a base member.

In further aspects, each first end post assembly, second end post assembly, and intermediate post comprise a securing means or securing mechanism for releasably securing within a mounting pocket. To this end, each of the foregoing that fit into stake or mounting pockets incorporate securing or anchoring mechanisms that keep the vertical or other associated member in place during use, while also allow convenient removal of intermediate posts as needed.

In further aspects, the first end post assembly and/or second end post assembly may comprise at least one guiding mechanism for directing or routing the cable along a cable path. In still further aspect, the first end post assembly and/or second end post assembly may comprise a plurality of guiding mechanisms for directing or routing the cable along a plurality of cable paths. In yet further aspects, the guiding mechanism may comprise at least one of a roller, pulley, or other like components effective for routing cable. In some aspects, the first end post assembly and/or second end post assembly may comprise a plurality of rollers for guiding or routing the cable. In other aspects, the first end post assembly and second end post assembly may comprise a plurality of pulleys for guiding the cable.

In further aspects, various embodiments of the present invention may comprise a plurality of intermediate posts. In still further aspects, the intermediate post may comprise a vertical post member, the first cable holder being positioned at a top portion of the post and the second cable holder being positioned at a middle portion of the post. In yet further aspects, the first cable holder of the intermediate post may correspond to a first cable path. In even further aspects, the second cable holder of the intermediate post may correspond to a second cable path. In still further aspects, the first cable holder of the intermediate post may correspond to a first cable railing. In yet further aspects, the second cable holder of the intermediate post may correspond to a second cable railing. In some aspects, the first cable holder of the intermediate post may correspond to a top railing. In other aspects, the second cable holder of the intermediate post may correspond to a middle railing. In still other aspects, the intermediate post may comprise a base portion configured to removably insert in a mounting pocket rather than a foot.

In further aspects, the cable winch may be mounted to the first and/or second end post assembly. In still further aspects, the cable winch may be mounted to the second or rear end post assembly. In yet further aspects, the cable winch may be mounted to the second end post assembly most distal to a vehicle cab or bulkhead. In even further aspects, the cable winch may be a reel, spool, or the like.

In further aspects, the first end post assembly and/or second end post assembly comprises a cable tension mechanism configured to couple with a second end of the cable. In still further aspects, the cable tension mechanism may comprise a spring-assist mechanism, such as and without limitation, a compression spring, extension spring, constant force spring, retraction spring, power spring, elastic retractor, torsion spring, or a combination thereof. In yet further aspects, the cable tension mechanism is a spring assembly or compression spring.

In further aspects, the cable tension mechanism can comprise a visual indicator configured to show if one or more predetermined criteria is met. The visual indicator may be configured to show a first color if the predetermined criteria is met, and a second color if the predetermined criteria is not met. The predetermined criteria may be at least one of: a requisite cable deflection, requisite force is applied to the cable, or requisite force is applied to the cable tension mechanism, or a combination thereof. For example, in various aspects, the predetermined criteria may include at least one of: OSHA's top and mid "rail" deflection requirement; the ability of the cable to withstand at least 200 lbs. of force and/or a maximum deflection of 3"; the ability of the cable to withstand at least 150 lbs. of force and/or a maximum deflection of 3"; a cable tensioned force of at least 1000 lbs., or a combination thereof. To this end, in some aspects, a first railing formed by the cable along the first cable path and/or top railing may be configured to withstand at least 200 lbs. of force with a maximum deflection of 3". In other aspects, a second railing formed by the cable along the second cable path and/or mid railing may be configured to withstand at least 150 lbs. of force with a maximum deflection of 3".

In further aspects, various embodiments of the present invention may further comprise at least one cross rail configured to connect with adjacent end post assemblies at the first end and/or second end. In still further aspects, there may be a plurality of cross rails configured to connect with adjacent end post assemblies at the first end and/or second end. The cross rail may be configured to connect with adjacent first end post assemblies at the first or front end. There may be a plurality of cross rails configured to connect with adjacent first end post assemblies at the first or front end. In further aspects, at least one cross rail may be configured to connect with adjacent second end post assemblies at the second or rear end. In even further aspects, a plurality of cross rails may be configured to connect with adjacent second end post assemblies at the second or rear end. To meet OSHA requirements, a top "rail" must rest between 42" and 45" high from the work surface, and a mid "rail" must be positioned approximately half of the vertical distance between the top "rail" and the work surface. To this end, one cross rail may correspond to a top "rail" height and/or one cross rail may correspond to a mid "rail" height. In further aspects, the cross rails may be under tension, or otherwise connected to a tension mechanism.

In further aspects, the cable of the present invention may comprise a rope, chain, webbing, a coated DYNEEMA or generic coated HMPE equivalent material, or other tensile element. In still further aspects, the cable diameter may be at least 5/16" in diameter.

In further aspects, the safety rail components may weigh no more than 43 lbs. In still further aspects, the safety rail can meet National Institute for Occupational Safety and Health (NIOSH) lifting weight guidelines for a typical worker. In yet further aspects, each of the end post assemblies and components attached thereto weigh no more than 43 lbs. In even further aspects, each of the end post assemblies and components attached thereto can meet NIOSH lifting weight guidelines for a typical worker.

In further aspects, some embodiments may further comprise a ladder assembly configured to be removable inserted in one or more mounting pockets. In still further aspects, the ladder portion of the assembly may be configured to pivotably rotate about an axis from deployed position to a locked position.

In various aspects, the component characteristics and configuration, such as, for example, size and dimensions, can be configured to adjust for an individual user's height, strength, and other factors to achieve optimal operating parameters, load balancing and/or stability. In further aspects, features of the system and components may be configured or utilized to set and/or control the characteristics. For example, at least one of the following may be configured: the type of material used for the posts and cable; the member dimensions (e.g., height, width, thickness, etc.); the tensile properties of the cable; and the force transmission characteristics of the tension mechanism.

In further aspects, while certain components of the disclosed system described herein can be permanently mounted in or on a post assembly, this is not a requirement. For example, the cable winch can be configured to be removably attached to the post assembly, e.g., to allow interchange and/or replacement of the cable winch. Such configurations allow users, drivers, workers, or others to select desired properties or levels in a component, e.g., for customization purposes, for personal preferences, to match desired use conditions, a user's physical characteristics, such as height or strength, or to repair or replace defective or damaged components, etc. Further, since the posts and post assemblies can be configured to be removably installed in existing stake holder hardware, the present disclosure also provides a retrofittable safety rail system comprising the components of the modular safety rail system.

In various aspects, the components of the disclosed system and components can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In yet further aspects, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like. In still further aspects, the system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof.

C. System Configuration

According to various aspects of the invention, the safety rails and systems of the present disclosure can comprise multiple configurations. FIGS. 1-11 illustrate non-limiting examples of embodiments of operating environments, mechanisms, and components for the disclosed safety rails and systems and methods for use. Although the operating environments, mechanisms, and components are disclosed with specific functionality, it should be understood that functionality may be shared between mechanisms and/or components, with some functions split between mechanisms and/or components, while other functions duplicated by the mechanisms and/or components. Furthermore, the name of the mechanisms and/or components should not be construed as limiting upon the functionality of the mechanisms and/or components. Moreover, each stage in a method or claim language can be considered independently without the context of the other stages. Each stage may contain language defined in other portions of this specifications. Each stage disclosed for one mechanism and/or component may be mixed with the operational stages of another mechanism and/or component. Each stage can be claimed on its own and/or interchangeably with other stages of other mechanisms and/or components.

FIG. 1 shows an exemplary embodiment of a safety rail system 100 for providing fall protection from an elevated flatbed platform 102 in accordance with the present invention. System 100 generally includes a plurality of post assemblies 101 configured to be removably secured in stake pocket 104, at least one intermediate post 103 configured to be removably secured in stake pocket 104; and a cable 105 configured to connect one end post assembly with another end post assembly by removably positioning within and passing through intermediate post 103, and when assembled and deployed form a 'safety rail'. In the example configuration shown in FIG. 1, system 100 has a first end post assembly 101a defining a front end of the resulting 'safety rail'; and a second end post assembly 101b defining a rear end of the 'safety rail'; intermediate post 103; cable 105 connecting first end post assembly 101a and second end post assembly 101b. As shown, cable 105 passes through and is otherwise removably positioned or secured within first cable holder 107 and second cable holder 109 of each intermediate post. In some configurations, system 100 may include a folding ladder assembly 106 configured to be removably secured in stake pocket 104 and used to climb up to access the flatbed platform. In other configurations, system 100 may include an exit gate, such as top and mid cross bars 108, configured to be removably secured between rear end post assemblies for protecting workers from falling off the back of the platform while working. Top and mid cross bars can pass left to right between two adjacent end post assemblies, which may be also be configured as tensioned lengths of chain or extendable pipe assemblies.

Figure 2:
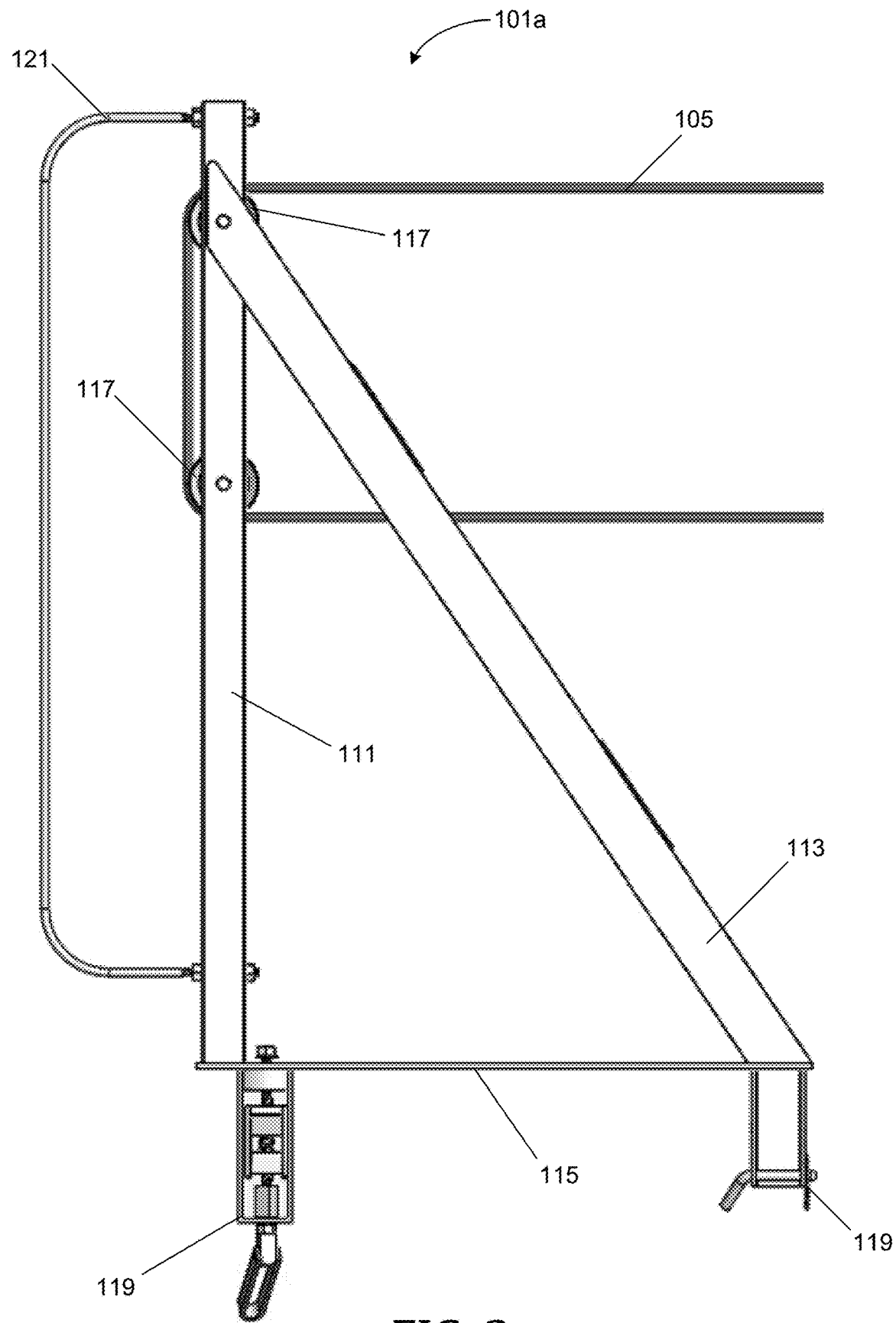
FIG. 2 shows a depiction of an end post assembly from a modular safety rail system in accordance with an exemplary embodiment of the present disclosure.

FIG. 2 shows as more detailed view of first end post assembly 101a. As shown, first end post assembly 101a generally serves as a front anchoring unit to provide a sturdy point of anchorage and direction for receiving and returning cable 105 to another end post assembly. First end post assembly 101a includes vertical member 111 having first and second opposed ends, cross member 113 having first and second opposed ends, base member 115 having first and second opposed ends, two cable rollers 117, through which cable 105 initially forms a top "rail" and then a mid "rail" as it travels on back to the connecting end post assembly unit, and multiple post securing mechanisms 119 configured as stake pocket inserts configured to be inserted in stake pockets for removably securing the end post assembly to the platform. As further described herein, post securing mechanism 119 can be a separate component that is attached or it may be integrated within end post assembly, such as at an end of the vertical and/or cross member. Each post securing mechanism 119 can be the same or different. First end post assembly 101a can further comprise a u-shaped member 121 that can be releasably attached to a portion of the assembly, such as to vertical member 111 as shown in FIG. 1. U-shaped member 121 may be sized and dimension to fill gap between the vertical member and the truck cabin, for example, about half the width of a platform segment shown in FIG. 1. U-shaped member 121 may also be used to grip or pull on for support. For example, when used in conjunction with folding ladder assembly 106, a user may hold onto u-shaped member 121 when ascending the ladder to get on the platform.

Figure 3:
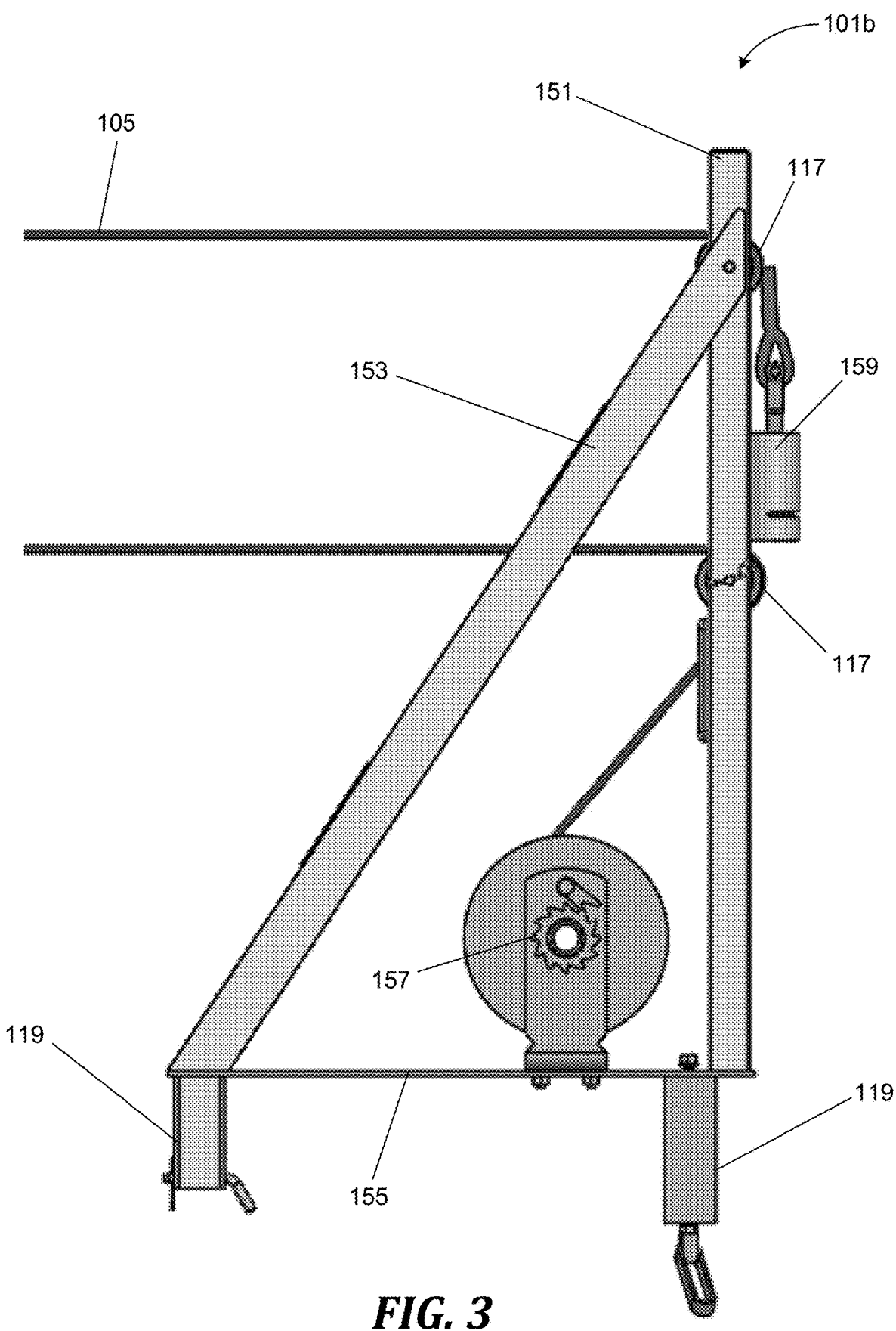
FIG. 3 shows a depiction of another end post assembly from a modular safety rail system in accordance with an exemplary embodiment of the present disclosure.

FIG. 3 shows a more detailed view of second end post assembly 101b. As shown, second end post assembly 101b generally serves as the rear anchor unit to provide a sturdy point of anchorage for dispensing and receiving back cable 105 from another end post assembly. Second end post assembly 101b includes vertical member 151 having first and second opposed ends, cross member 153 having first and second opposed ends, base member 155 having first and second opposed ends, a cable spool winch 157 coupled with one end of cable 105, cable tension mechanism 159 configured in the form of a spring assembly coupled with the other end cable 105, two cable rollers 117, through which cable 105 initially forms the mid "rail" and then a top "rail" as it travels back from the connecting end post assembly unit, and multiple post securing mechanisms 119 configured as stake pocket inserts configured to be inserted in stake pockets for removably securing the end post assembly to the platform. Similarly, post securing mechanism 119 in this assembly can be a separate component that is attached or it may be integrated within end post assembly, such as at an end of the vertical and/or cross member. Each post securing mechanism 119 can be the same or different. In various aspect, second end post assembly 101b can provide a braced position from which to tension cable 105 with winch 157 and is located at a reasonable height for the user on the ground to operate while still allowing the "rails" to reach the proper height of the position of the cable holders on the intermediate posts.

Figure 4A:
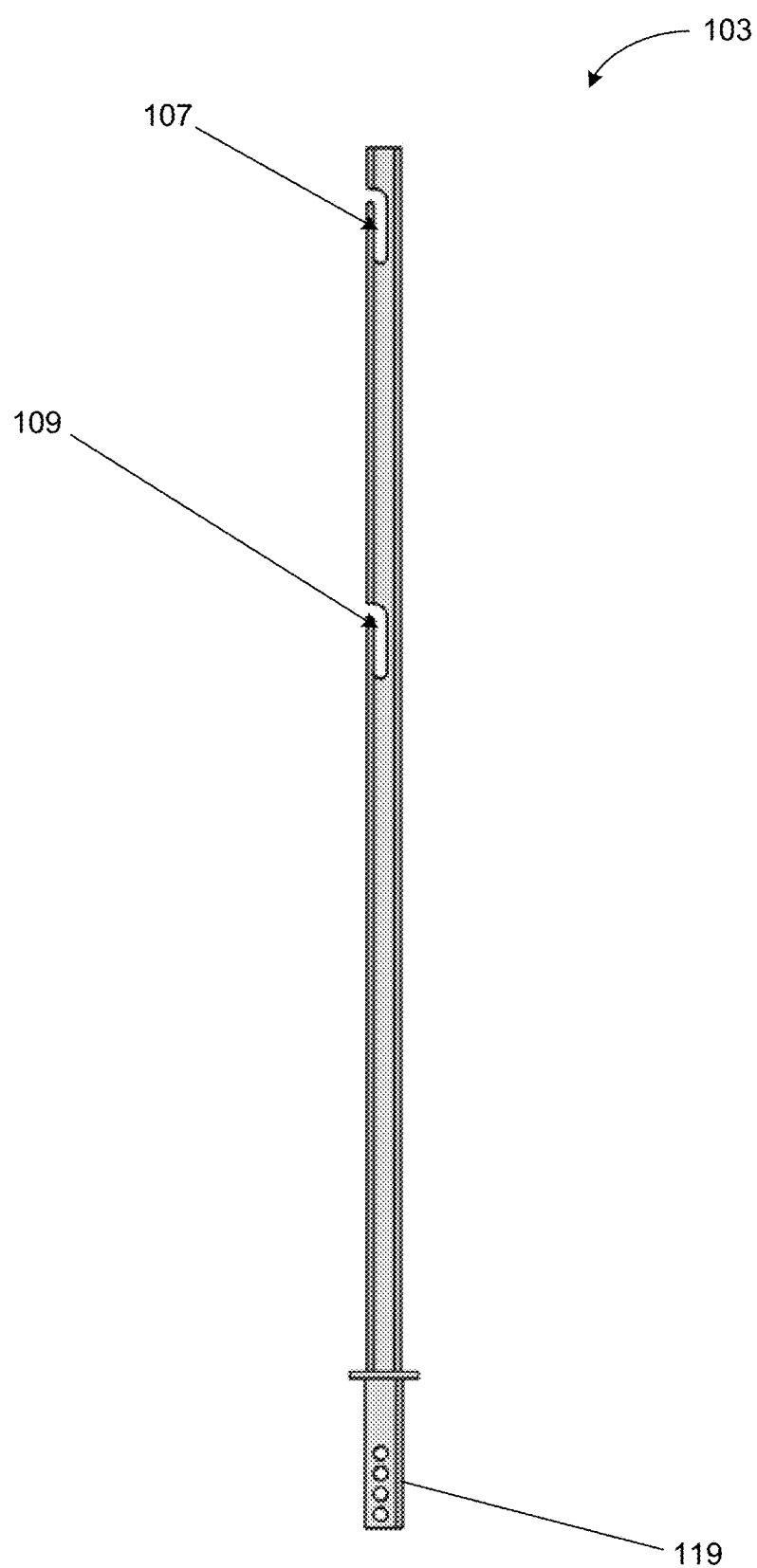
FIG. 4A shows a depiction of an intermediate post from a modular safety rail system in accordance with an exemplary embodiment of the present disclosure.
Figure 4B:
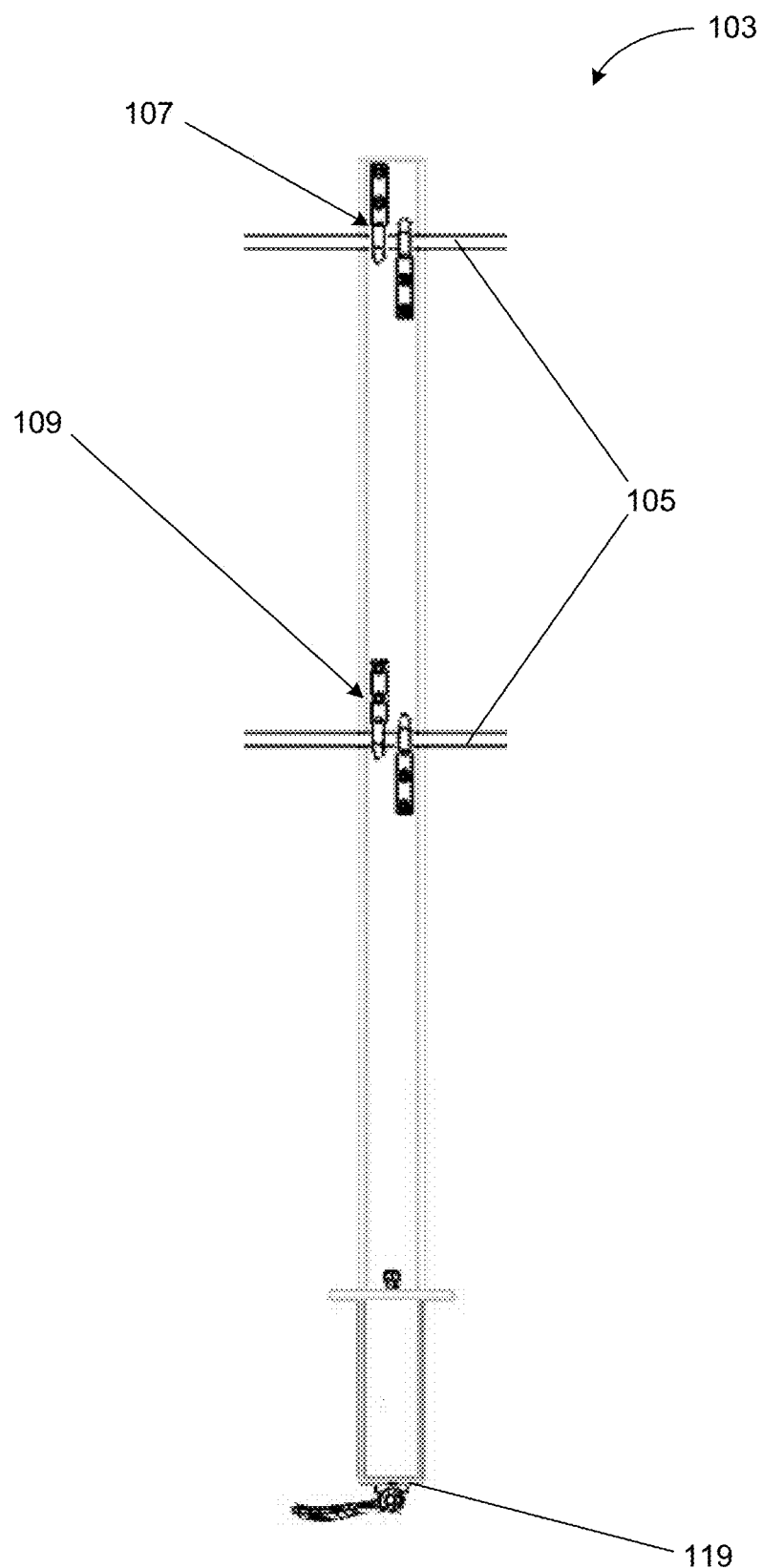
FIG. 4B shows a depiction of an intermediate post from a modular safety rail system in accordance with an exemplary embodiment of the present disclosure.
Figure 5:
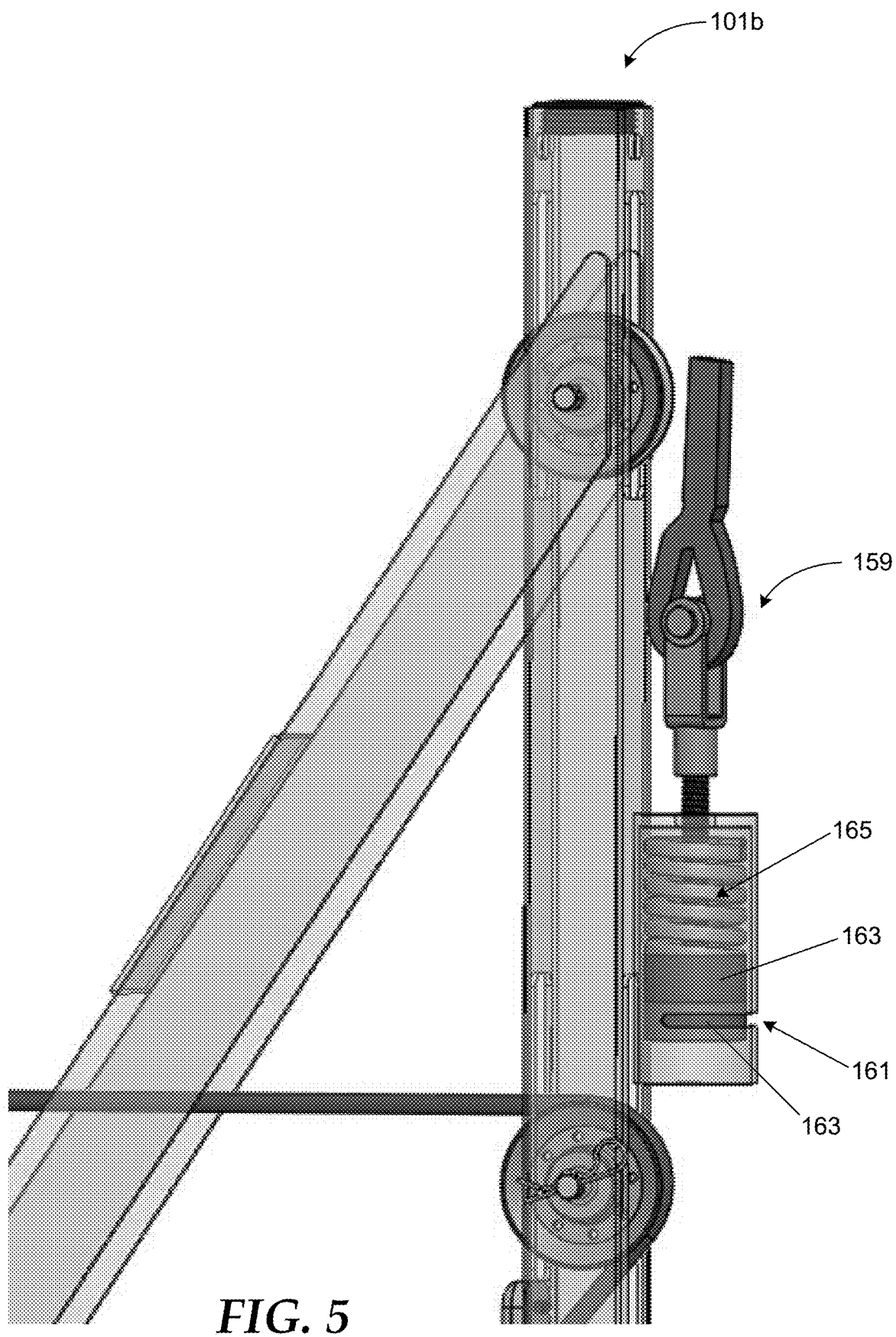
FIG. 5 shows a depiction of an end post assembly in accordance with an exemplary embodiment of the present disclosure.
Figure 6:
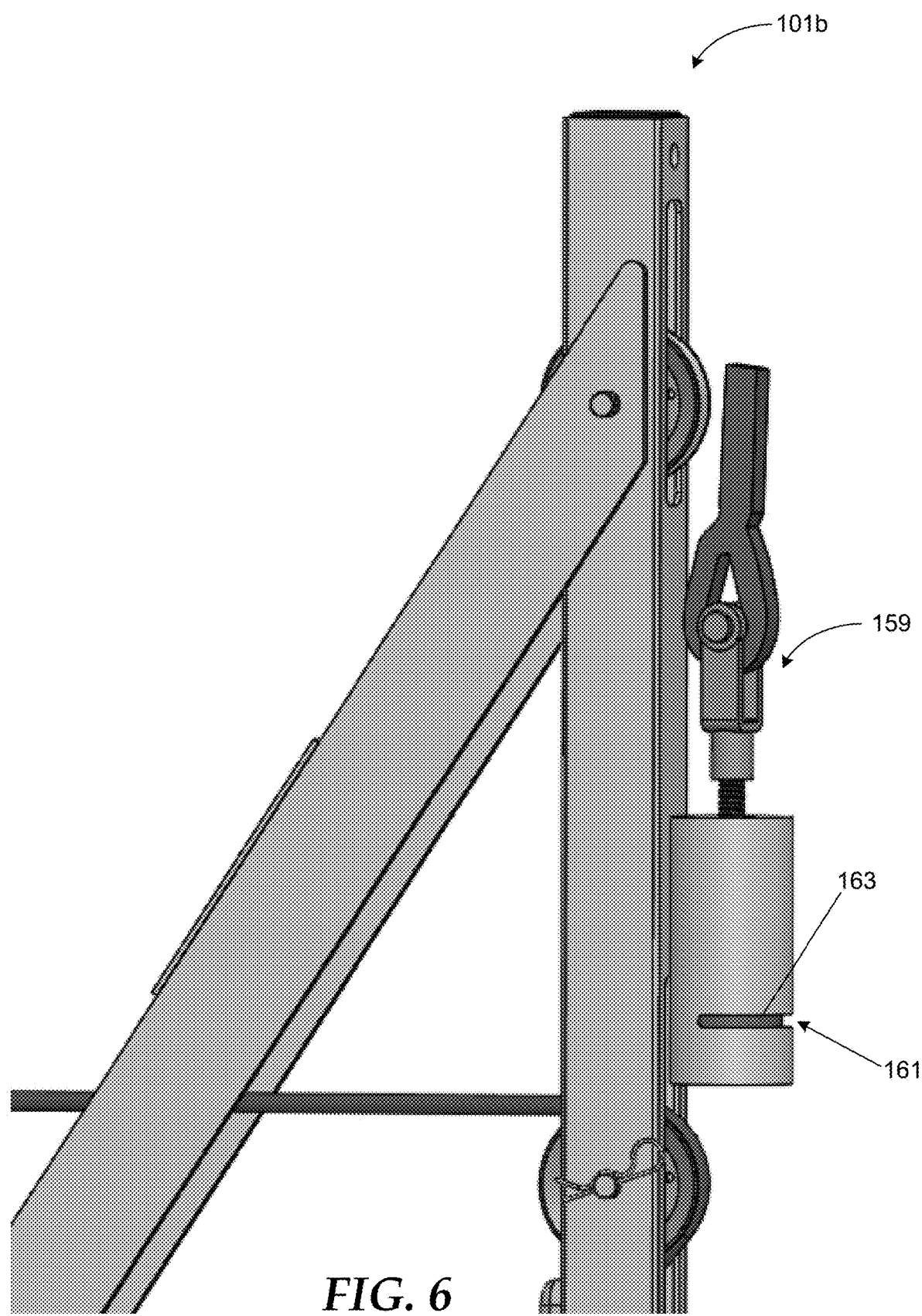
FIG. 6 shows a depiction of an end post assembly in accordance with an exemplary embodiment of the present disclosure.
Figure 7:
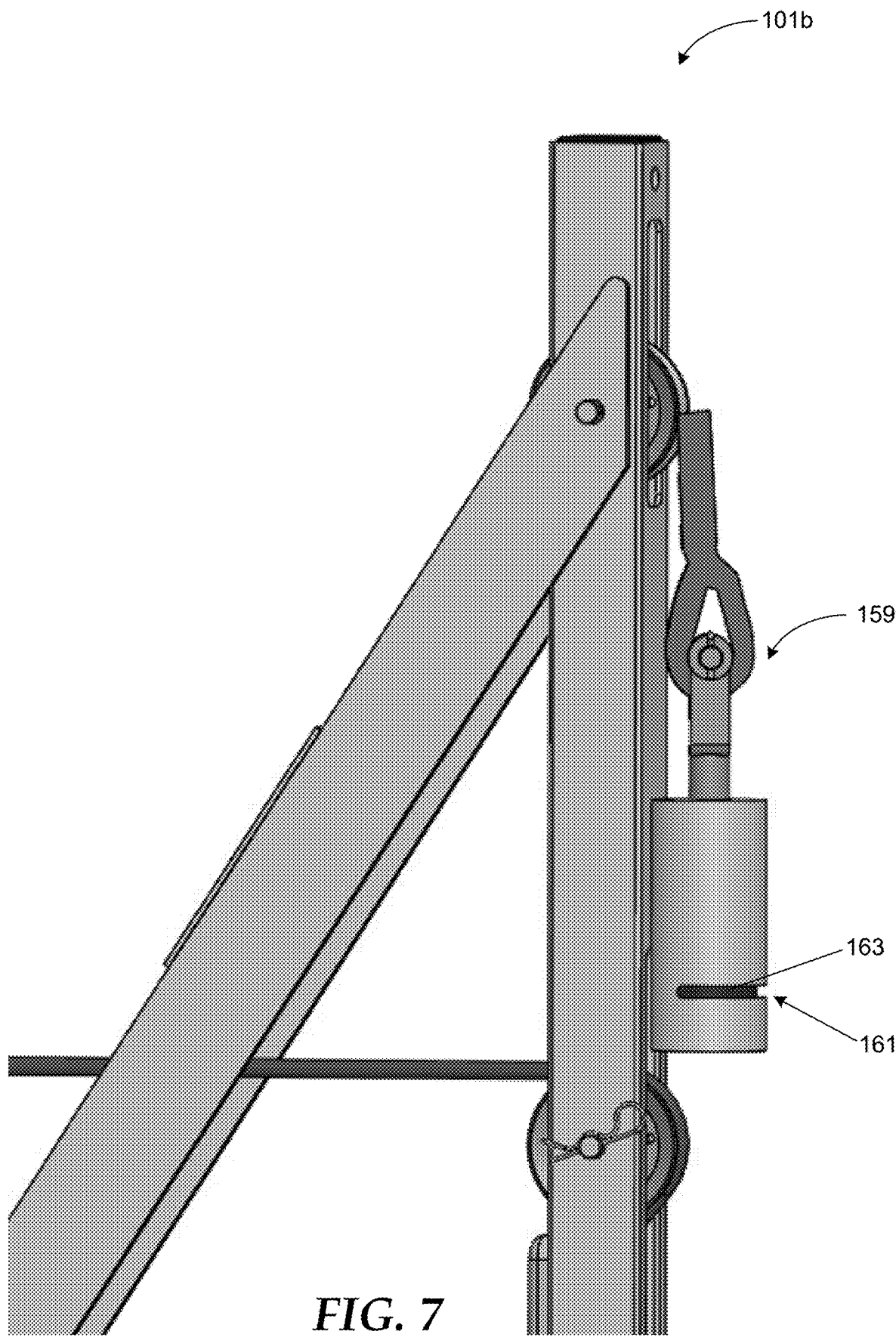
FIG. 7 shows a depiction of an end post assembly in accordance with an exemplary embodiment of the present disclosure.
Figure 8:
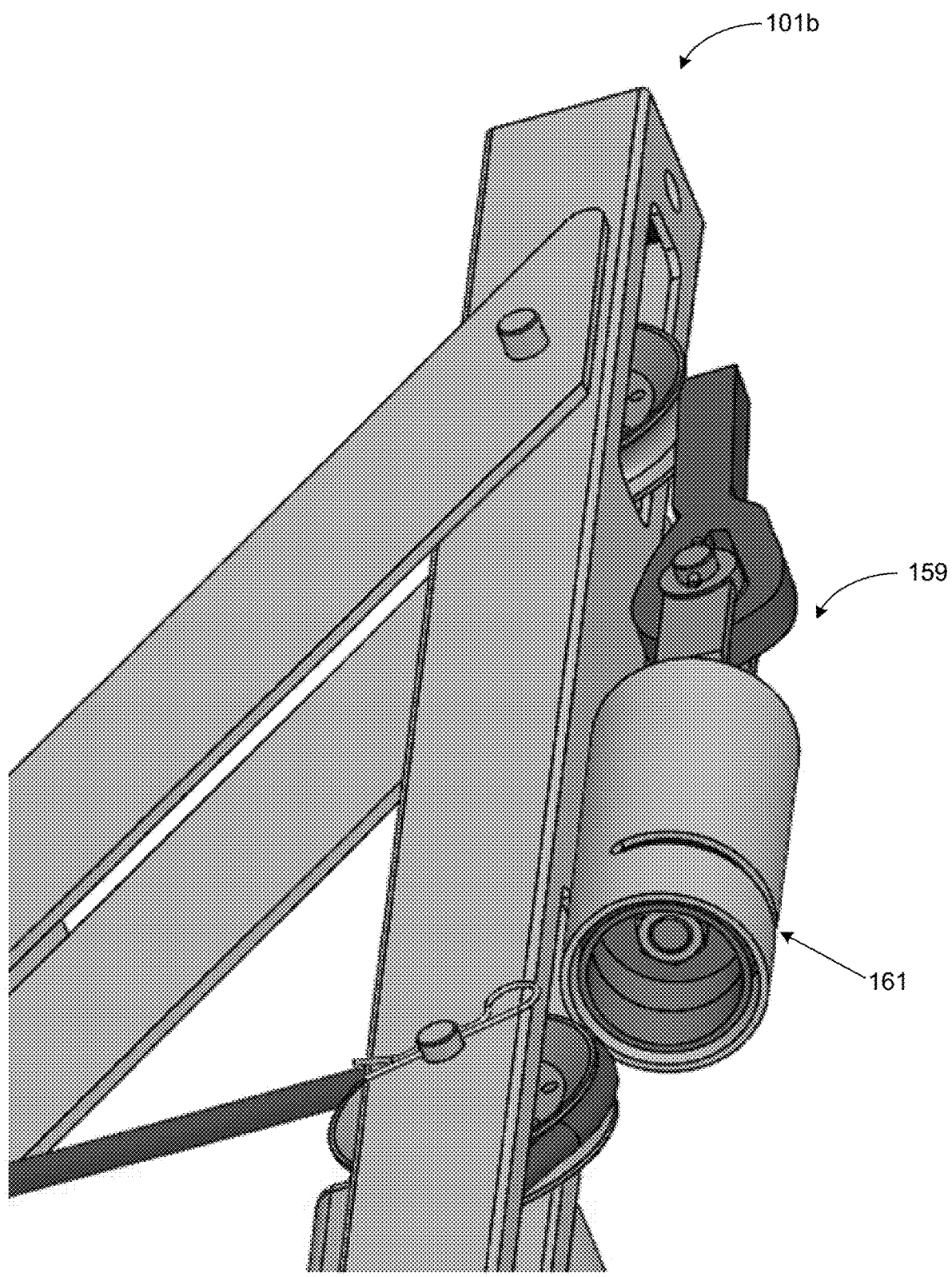
FIG. 8 shows a depiction of an end post assembly in accordance with an exemplary embodiment of the present disclosure.

FIGS. 4A and 4B show views of embodiments of intermediate post assembly 103. As shown in FIG. 4A, intermediate post 103 includes first cable holder 107 corresponding to a top "rail" formed by the cable and second cable holder 109 corresponding to a mid "rail" formed by the cable, which provide rigidity to the system as holders for the cable railing, bridging the distance between the front and back of the system when deployed. Open cable holders within the intermediate post vertical member can allow for the intermediate post then to be hung on a deployed cable 'rail', a novel design feature that allows convenient loading and unloading of freight to/from the platform and flexibility in the sequencing and number of posts for installation and removal. Each intermediate post unit of the system can be removed from its stake pocket(s) when the cable is released from tension. These intermediate posts can hang from the cable while freight is loaded from either side of the bed. As shown in an alternative embodiment of intermediate post 103 in FIG. 4B, first cable holder 107 and second cable holder 109 can be configured as cable securing components that are attached to or otherwise disposed on the vertical member body. The cable securing component is configured to releasably secure the cable, and can take the form of a hook, latch, clasp, clip, or other like component that would allow the cable to be easily attached and detached from the post.

In various aspects, each first end post assembly, second end post assembly, and intermediate posts are configured to be removably inserted into the one or more stake pockets of the flatbed. They can incorporate various securing mechanisms that keep posts in place during use but also allow convenient removal as needed. In further aspects, cable 105 may be a single length static synthetic rope or cable, and used to create the top and mid "rail" lengths in the system on each side of the flatbed. This cable length would anchor on the top of the second end post assembly, pass through the top cable holders on each intermediate post, pass through the top of the first end post assembly, turn down and around two cable rollers, return through the second cable holder corresponding to the mid "rail" on each intermediate post, and get tightened by the cable winch attached to the bottom of the second end post assembly.

FIGS. 5-8 show more detailed views of cable tension mechanism 159 in second end post assembly 101b. As shown, cable tension mechanism 159 can include a visual indicator 161 configured to tell the user or operator when the rail formed by cable 105 is tensioned sufficiently. Painted color indicators 163 may be used to show the user that the spring assembly is fully compressed. To this end, a compression spring 165 contained therein can show a color indicating proper tension for the cable 105 when a proper level of tension has been achieved by the force exerted by the winch on the rope pulling against the spring assembly, thus enabling an operator to visually confirm when the rope rail is tensioned sufficiently to protect workers from falls.

FIGS. 9A-10B show various views and components of example embodiments of post securing mechanisms 119 for keeping posts secured within stake pockets. As shown, securing mechanism 119 can comprise a tubular housing 171 that is substantially the same dimensions and shape as the post body and configured to fit within stake pockets. In some embodiments, one or more securing mechanisms may be attached to the bottom portion or base plate member of each first end post assembly, second end post assembly, and/or intermediate posts using a mechanical fastener 173, such as a screw or bolt or the like. In some embodiments, the securing mechanisms may be permanently attached to or integrated within the base or bottom portion of a post body or post assembly. Post securing mechanism 119 included a retractable element 175 or latch contained within the mechanism housing. The retractable element may be operatively connected with a cam and lever 177 or the like for extension and retraction from within the housing.

Figures 9A, 9B:
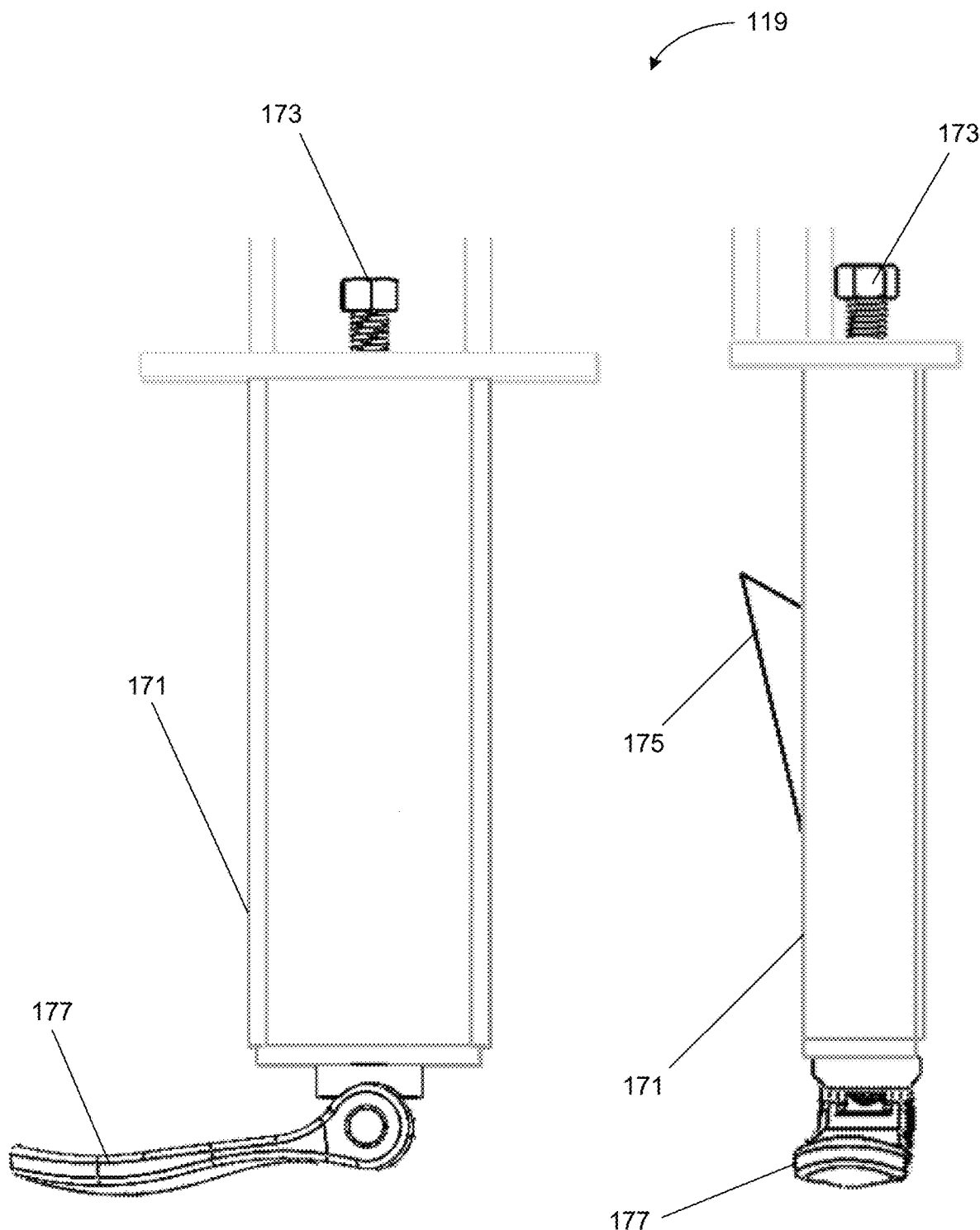
FIGS. 9A-9E show depictions of an intermediate post with post securing mechanism in accordance with an exemplary embodiment of the present disclosure.
Figures 9C, 9D:
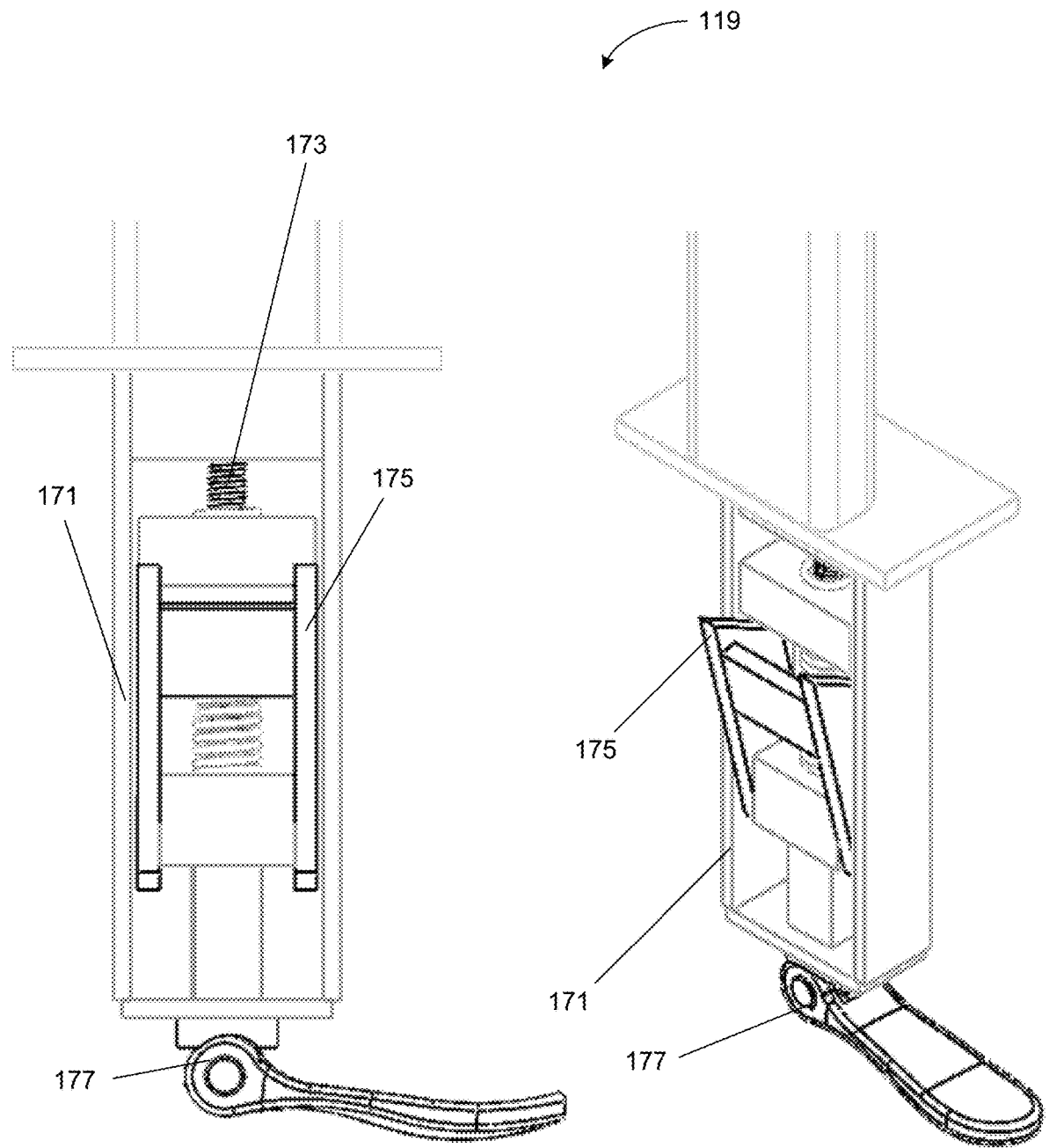
Figure 9E:
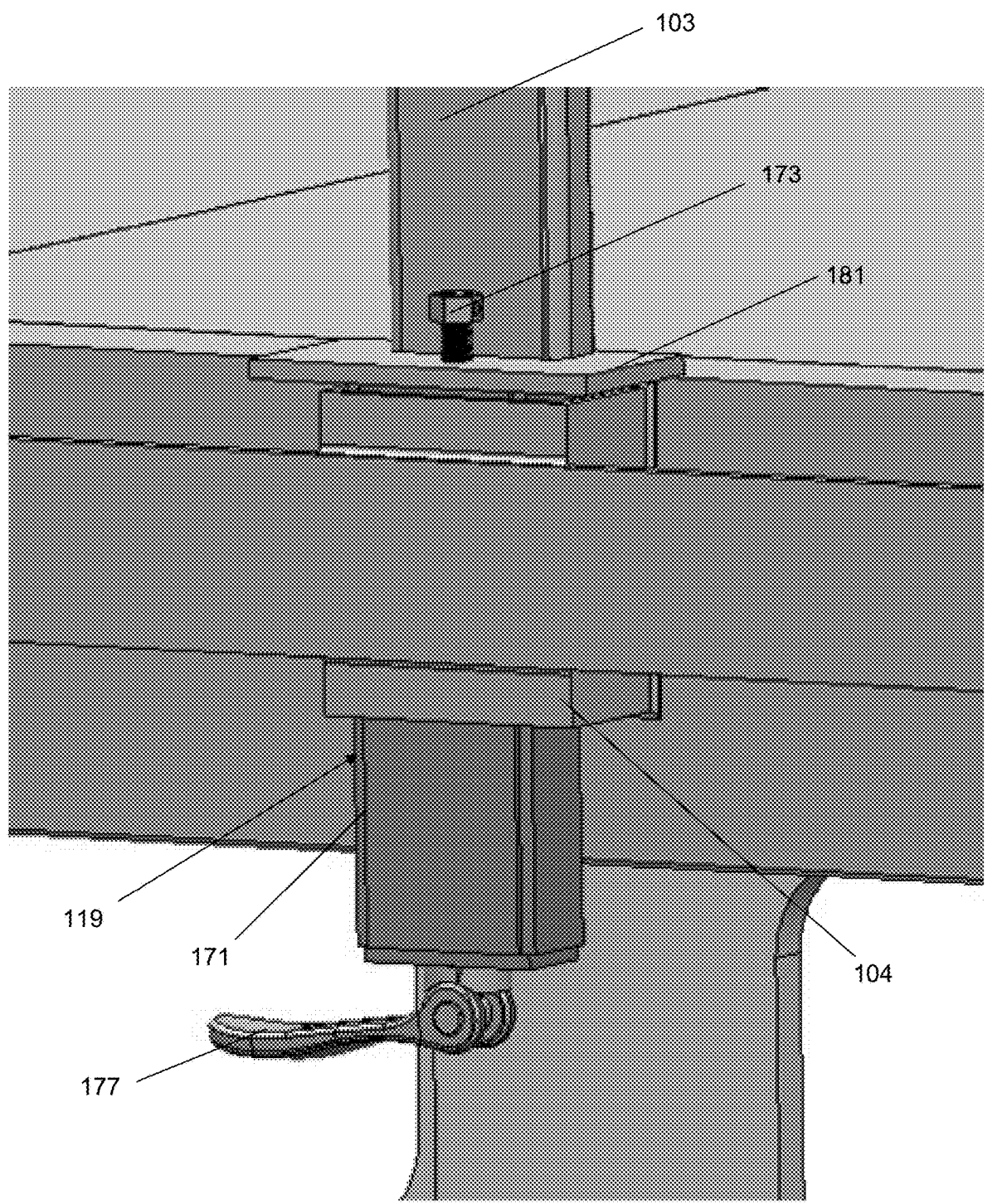

As shown in FIG. 9E, retractable element 171 and the base plate 181 cooperate to keep the post 103 within the stake pocket 104. Since the width/length of stake pockets can vary, the extension distance of the retractable element beyond the housing can be finely adjusted by rotating the cam lever 177 in a screw like fashion to adjust the extension distance of the retractable element and thus, the width/length dimension of the securing mechanism. To this end, a user can extend the retractable element out far enough such that the width/length dimension of the securing mechanism is just slightly less than the corresponding width/length of the stake pocket to allow the securing mechanism and post to be inserted within the stake pocket until the base plate reaches the top of the stake pocket and the top of the retractable element is located below the bottom of the stake pocket. Once inserted, the cam lever can be actuated to cause the retractable element to extend outward beyond the stake pocket walls, and thus secure the post with the stake pocket. Accordingly, once the cam lever is actuated, the width/length dimension of the securing mechanism is larger than the corresponding width/length of the stake pocket to prevent the post from being removed from within the stake pocket. The post can easily be removed by pulling the cam lever down to reverse the actuation, where the width/length dimension of the securing mechanism return to being just slightly less than the corresponding width/length of the stake pocket to allow removal from within the stake pocket.

D. System Operation and Methods for Use

Also disclosed herein are methods of using a disclosed safety rail and system. For example, in another exemplary aspect, the present disclosure provides a method of providing fall protection for a flatbed platform using a disclosed safety rail and system. In further aspects, the flatbed platform may be a flatbed trailer or a straight body truck flatbed. In one aspect, the disclosed method can comprise one or more of: installing a first end post assembly at first end of an elevated flatbed platform along a perimeter side; installing a second end post assembly at a second end of the perimeter side; installing at least one intermediate post between first and second end post assemblies; routing a cable through a first cable holder and second cable holder within each intermediate post effective to form a top railing and a bottom railing; tensioning the cable to meet minimum cable deflection requirements; installing a plurality of intermediate posts; and releasing tension from the cable effective to allow removal of at least one intermediate post.

FIG. 11 is a flow chart setting forth the general stages involved in a method 1000 consistent with an embodiment of the disclosure for operating the disclosed safety rails and systems. Method 1000 may be implemented using, at least in part, safety rail system 100 as described in more detail with respect to FIG. 1-10B.

Although stages are disclosed with reference to the safety rail system in FIGS. 1-10, it should be understood that other disclosed embodiments may enable the operation of method 1000, including, but not limited to, other mechanisms, mechanical components, environment properties, user conditions, and the like. Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1000 may begin at starting block 1005 and proceed to stage 1010, where a first end post assembly is installed at a first end of an elevated flatbed platform along a perimeter side. From stage 1010, where the first end post assembly is installed at the first end, method 1000 may proceed to stage 1020 where a second end post assembly is installed at a second end of the same perimeter side. From stage 1020, where the second end post assembly has been installed method 1000 may proceed to stage 1030, where the user may then install an intermediate post. This step may be repeated until the required number of intermediate posts are installed, which are generally set no further than 6' apart along the length of the platform. Upon inserting the end posts and intermediate posts into the stake pocket, integrated locking mechanisms can be utilized to keep the posts in place during use but also allow convenient removal as needed.

From stage 1030, where the intermediate posts are installed, method 1000 may proceed to stage 1040, where the user will route and position the cable through each first cable holder and second cable holder within each intermediate post effective to form a top railing and a bottom railing. From stage 1040, where the user has routed the cable to form a top railing and a bottom railing, method 1000 may proceed to stage 1050, where the user may tension the cable with the cable winch to meet minimum cable deflection requirements. A spring assembly located on the second end post assembly will enable the user to see a visual indicator when the rope rail is tensioned sufficiently to protect workers on the bed from falls. After stage 1050, method 1000 may end at stage 1050. Each section of the system can be removed from its stake pocket(s) when the rope rail is released from tension. In some embodiments, the user may install top and mid "rail" cross sections of chain under tension to provide fall protection between the left and right rear sections and also between the left and right front sections in the absence of a bulkhead on the front of a bed or truck platform.

Also disclosed herein are kits comprising the disclosed modular safety rail and system. For example, in an exemplary aspect, the present disclosure provides a fall protection kit for flatbed platforms comprising: a disclosed safety rail; and instructions for using the safety rail in connection with providing fall protection for a flatbed platform, such as a truck flatbed or trailer flatbed. In further aspects, the instruction and/or method may comprise any method and/or method step disclosed herein. In still further aspects, the method and/or method step may comprise mounting or installing a disclosed post assembly to a flatbed platform. In even further aspects, the method and/or method step can involve releasably installing and/or removing one or more intermediate post from the safety rail.

The present invention includes at least the following aspects: Aspect 1: A safety rail for a flatbed platform, comprising: a first end post assembly defining a first end of the safety rail; a second end post assembly defining a second end of the safety rail; at least one intermediate post, each intermediate post comprising a first cable holder and a second cable holder; a cable configured to connect with the first end post assembly and the second end post assembly and configured to be removably positioned within and pass through the first cable holder and second cable holder of each intermediate post; and a cable winch connected to a first end of the cable and configured to spool and unspool the cable; wherein each first end post assembly, second end post assembly, and intermediate post are configured to be removably inserted into one or more mounting pockets defined along a perimeter of the flatbed platform.

Aspect 2: A fall protection system comprising: a modular safety rail for a flatbed platform comprising: a first end post assembly defining a first end of the safety rail; a second end post assembly defining a second end of the safety rail; at least one intermediate post, each intermediate post comprising a first cable holder and a second cable holder; a cable configured to connect with the first end post assembly and the second end post assembly and configured to be removably positioned within and pass through the first cable holder and second cable holder of each intermediate post; a cable winch connected to the second end post assembly and configured to spool and unspool the cable; and a cable tension mechanism connected to the second end post assembly and configured to couple with one end of the cable, the cable tension mechanism including a visual indicator configured to show if one or more predetermined cable tension criteria is met; and a flatbed platform including one or more mounting pockets defining a perimeter of the flatbed platform; wherein each first end post assembly, second end post assembly, and intermediate post are configured to be removably inserted into the one or more mounting pockets of the flatbed platform.

Aspect 3: The safety rail of any preceding aspect, wherein each first end post assembly, second end post assembly, and intermediate post comprise at least one vertical post member having first and second opposed ends.

Aspect 4: The safety rail of any preceding aspect, wherein the first end post assembly comprises at least one of a vertical member having first and second opposed ends, a cross member having first and second opposed ends, or a base member having first and second opposed ends, or a combination thereof.

Aspect 5: The safety rail of any preceding aspect, wherein the first end post assembly comprises at least one vertical member, cross member, and base member.

Aspect 6: The safety rail of any preceding aspect, wherein the second end post assembly comprises at least one of a vertical member having first and second opposed ends, a cross member having first and second opposed ends, or a base member having first and second opposed ends, or a combination thereof.

Aspect 7: The safety rail of any preceding aspect, wherein the second end post assembly comprises at least one vertical member, cross member, and base member.

Aspect 8: The safety rail of any preceding aspect, wherein the intermediate post comprises at least one vertical member having first and second opposed ends.

Aspect 9: The safety rail of any preceding aspect, wherein the member comprises a tubular member or flat member or combinations thereof.

Aspect 10: The safety rail of any preceding aspect, wherein a portion of the first end post assembly and/or second end post assembly is configured to be removably inserted into the one or more mounting pockets.

Aspect 11: The safety rail of any preceding aspect, wherein the first end post assembly and/or second end post assembly comprises at least one foot configured to be removably inserted into the one or more mounting pockets.

Aspect 12: The safety rail of any preceding aspect, wherein the first end post assembly and/or second end post assembly comprises a plurality of feet.

Aspect 13: The safety rail of any preceding aspect, wherein the foot is configured to be adjustably positioned along a base member.

Aspect 14: The safety rail of any preceding aspect, wherein each first end post assembly, second end post assembly, and intermediate post comprise a securing means or securing mechanism for releasably securing within a mounting pocket.

Aspect 15: The safety rail of any preceding aspect, wherein the first end post assembly and/or second end post assembly comprises at least one guiding mechanism for directing or routing the cable along a cable path.

Aspect 16: The safety rail of any preceding aspect, wherein the first end post assembly and/or second end post assembly comprises a plurality of guiding mechanisms for directing or routing the cable along a plurality of cable paths.

Aspect 17: The safety rail of any preceding aspect, wherein the guiding mechanism comprises at least one of a roller, pulley, groove, smooth round pipe, or other like component effective for routing cable.

Aspect 18: The safety rail of any preceding aspect, wherein the first end post assembly and/or second end post assembly comprises a plurality of pulleys, grooves, or smooth round pipe for guiding the cable.

Aspect 19: The safety rail of any preceding aspect, wherein the first end post assembly and second end post assembly comprise a plurality of pulleys, grooves, or smooth round pipe for guiding the cable.

Aspect 20: The safety rail of any preceding aspect, further comprising a plurality of intermediate posts.

Aspect 21: The safety rail of any preceding aspect, wherein the intermediate post comprises a vertical post member, the first cable holder positioned at a top portion of the post and the second cable holder positioned at a middle portion of the post.

Aspect 22: The safety rail of any preceding aspect, wherein the first cable holder of the intermediate post corresponds to a first cable path.

Aspect 23: The safety rail of any preceding aspect, wherein the second cable holder of the intermediate post corresponds to a second cable path.

Aspect 24: The safety rail of any preceding aspect, wherein the first cable holder of the intermediate post corresponds to a first cable railing.

Aspect 25: The safety rail of any preceding aspect, wherein the second cable holder of the intermediate post corresponds to a second cable railing.

Aspect 26: The safety rail of any preceding aspect, wherein the first cable holder of the intermediate post corresponds to a top railing.

Aspect 27: The safety rail of any preceding aspect, wherein the second cable holder of the intermediate post corresponds to a middle railing.

Aspect 28: The safety rail of any preceding aspect, wherein the intermediate post comprises a base portion configured to removably insert in a mounting pocket.

Aspect 29: The safety rail of any preceding aspect, wherein the cable winch is mounted to the first and/or second end post assembly.

Aspect 30: The safety rail of any preceding aspect, wherein the cable winch is mounted to the second end post assembly most distal to a vehicle cab or bulkhead.

Aspect 31: The safety rail of any preceding aspect, wherein the cable winch is a reel, spool, or the like.

Aspect 32: The safety rail of any preceding aspect, wherein the first end post assembly and/or second end post assembly comprises a cable tension mechanism configured to couple with a second end of the cable.

Aspect 33: The safety rail of any preceding aspect, wherein the cable tension mechanism comprises a spring assembly.

Aspect 34: The safety rail of any preceding aspect, wherein the cable tension mechanism comprises a visual indicator configured to show if one or more predetermined criteria is met.

Aspect 35: The safety rail of any preceding aspect, wherein the visual indicator is configured to show a first color if the predetermined criteria is met, and a second color if the predetermined criteria is not met.

Aspect 36: The safety rail of any preceding aspect, wherein the predetermined criteria is at least one of: a requisite cable deflection, requisite force is applied to the cable, or requisite force is applied to the cable tension mechanism, or a combination thereof.

Aspect 37: The safety rail of any preceding aspect, wherein the predetermined criteria is OSHA's top and mid "rail" deflection requirement.

Aspect 38: The safety rail of any preceding aspect, wherein the predetermined criteria is the ability of the cable to withstand at least 200 lbs. of force and/or a maximum deflection of 3".

Aspect 39: The safety rail of any preceding aspect, wherein the predetermined criteria is the ability of the cable to withstand at least 150 lbs. of force and/or a maximum deflection of 3".

Aspect 40: The safety rail of any preceding aspect, wherein the predetermined criteria is cable tensioned force of at least 1000 lbs.

Aspect 41: The safety rail of any preceding aspect, wherein a first railing formed by the cable along the first cable path and/or top railing is configured to withstand at least 200 lbs. of force with a maximum deflection of 3".

Aspect 42: The safety rail of any preceding aspect, wherein a second railing formed by the cable along the second cable path and/or mid railing is configured to withstand at least 150 lbs. of force with a maximum deflection of 3".

Aspect 43: The safety rail of any preceding aspect, further comprising at least one cross rail configured to connect with adjacent end post assemblies at the first end and/or second end.

Aspect 44: The safety rail of any preceding aspect, further comprising a plurality of cross rails configured to connect with adjacent end post assemblies at the first end and/or second end.

Aspect 45: The safety rail of any preceding aspect, further comprising at least one cross rail configured to connect with adjacent first end post assemblies at the first or front end.

Aspect 46: The safety rail of any preceding aspect, further comprising a plurality of cross rails configured to connect with adjacent first end post assemblies at the first or front end.

Aspect 47: The safety rail of any preceding aspect, further comprising at least one cross rail configured to connect with adjacent second end post assemblies at the second or rear end.

Aspect 48: The safety rail of any preceding aspect, further comprising a plurality of cross rails configured to connect with adjacent second end post assemblies at the second or rear end.

Aspect 49: The safety rail of any preceding aspect, wherein the cross rail is under tension, or otherwise connected to a tension mechanism.

Aspect 50: The safety rail of any preceding aspect, wherein the cable comprises a rope, chain, webbing, or other tensile element.

Aspect 51: The safety rail of any preceding aspect, wherein the safety rail components weigh no more than 43 lbs.

Aspect 52: The safety rail of any preceding aspect, wherein the safety rail meets NIOSH lifting weight guidelines for a typical worker.

Aspect 53: The safety rail of any preceding aspect, each of the end post assemblies and components attached thereto weigh no more than 43 lbs.

Aspect 54: The safety rail of any preceding aspect, each of the end post assemblies and components attached thereto meet NIOSH lifting weight guidelines for a typical worker.

Aspect 55: The safety rail of any preceding aspect, each of the intermediate post weigh no more than 43 lbs.

Aspect 56: The safety rail of any preceding aspect, each of the intermediate posts meet NIOSH lifting weight guidelines for a typical worker.

Aspect 57: The safety rail of any preceding aspect, further comprising a ladder assembly configured to be removable inserted in one or more mounting pockets.

Aspect 58: The safety rail of any preceding aspect, wherein a ladder portion is configured to pivotably rotate about an axis from deployed position to a locked position.

Aspect 59: The safety rail of any preceding aspect, wherein the flatbed platform is a flatbed trailer or truck flatbed platform, or a combination thereof.

Aspect 60: The safety rail of any preceding aspect, wherein the cable holder comprises a cable securing component.

Aspect 61: The safety rail of any preceding aspect, wherein the cable securing component is attached to or otherwise disposed on a post body.

Aspect 62: The safety rail of any preceding aspect, wherein the cable securing component is configured to releasably secure the cable.

Aspect 63: The safety rail of any preceding aspect, wherein the cable securing component comprises a hook, latch, clasp, clip, or other like component that would allow the cable to be easily attached and detached from the post.

Aspect 64: A method of providing fall protection for an elevated flatbed platform, the method comprising the steps of: a) installing a first end post assembly at first end of an elevated flatbed platform along a perimeter side; b) installing a second end post assembly at a second end of the perimeter side; c) installing at least one intermediate post between first and second end post assemblies; d) routing a cable through a first cable holder and second cable holder within each intermediate post effective to form a top railing and a bottom railing; and e) tensioning the cable to meet minimum cable deflection requirements.

Aspect 65: The method of any preceding aspect, further comprising installing a plurality of intermediate posts.

The method of any preceding aspect, releasing tension from the cable effective to allow removal of at least one intermediate post.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A safety rail for a flatbed platform, comprising:
a first end post assembly defining a first end of the safety rail;
a second end post assembly defining a second end of the safety rail;
at least one intermediate post, each intermediate post comprising a first cable holder and a second cable holder;
a cable configured to connect with the first end post assembly and the second end post assembly and configured to be removably positioned within and pass through the first cable holder and second cable holder of each intermediate post; and
a cable winch connected to a first end of the cable and configured to spool and unspool the cable;
wherein each first end post assembly, second end post assembly, and intermediate post are configured to be removably inserted into one or more mounting pockets defined along a perimeter of the flatbed platform; and
wherein the second end post assembly comprises a cable tension mechanism configured to couple with a second end of the cable, the cable tension mechanism including a visual indicator configured to show if one or more predetermined criteria is met.

2. The safety rail of claim 1, wherein the first end post assembly and second end post assembly each comprise at least one vertical member having first and second opposed ends, a cross member having first and second opposed ends, and a base member having first and second opposed ends, or a combination thereof.

3. The safety rail of claim 1, wherein the first end post assembly and second end post assembly comprise at least one foot insert configured to be removably inserted into the one or more mounting pockets on a flatbed platform.

4. The safety rail of claim 1, wherein each first end post assembly, second end post assembly, and intermediate post comprise a post securing mechanism for releasably securing within the mounting pocket.

5. The safety rail of claim 1, wherein the first end post assembly and second end post assembly comprise at least one guiding mechanism for directing or routing the cable along a cable path.

6. The safety rail of claim 1, wherein the intermediate post comprises a vertical post member, the first cable holder positioned at a top portion of the post and the second cable holder positioned at a middle portion of the post.

7. The safety rail of claim 1, wherein the visual indicator is configured to show a first color if the predetermined criteria is met, and a second color if the predetermined criteria is not met.

8. The safety rail of claim 7, wherein the predetermined criteria is at least one of: a requisite cable deflection, requisite force is applied to the cable, or requisite force is applied to the cable tension mechanism, or a combination thereof.

9. The safety rail of claim 1, wherein the predetermined criteria is the ability of the cable to withstand at least 200 lbs. of force and/or a maximum deflection of 3".

10. A fall protection system comprising:
a modular safety rail for a flatbed platform comprising:
a plurality of first end post assemblies defining first ends of the safety rail;
a plurality of second end post assemblies defining second ends of the safety rail;
a plurality of intermediate posts, each intermediate post comprising a first cable holder and a second cable holder;
a cable configured to connect with a first end post assembly and a second end post assembly and configured to be removably positioned within and pass through the first cable holder and second cable holder of each intermediate post;
a cable winch connected to the second end post assembly and configured to spool and unspool the cable; and
a cable tension mechanism connected to the second end post assembly and configured to couple with one end of the cable, the cable tension mechanism including a visual indicator configured to show if one or more predetermined cable tension criteria is met; and
a flatbed platform including one or more mounting pockets defining a perimeter of the flatbed platform;
wherein each first end post assembly, second end post assembly, and intermediate post are configured to be removably inserted into the one or more mounting pockets of the flatbed platform.

11. The system of claim 10, wherein the first end post assembly and second end post assembly comprise at least one foot insert configured to be removably inserted into the one or more mounting pockets on a flatbed platform.

12. The system of claim 11, wherein each first end post assembly, second end post assembly, and intermediate post comprise a post securing mechanism for releasably securing within the mounting pocket.

13. The system of claim 12, wherein the first end post assembly and second end post assembly comprise at least one guiding mechanism for directing or routing the cable along a cable path.

14. The system of claim 13, wherein the intermediate post comprises a vertical post member, the first cable holder positioned at a top portion of the post and the second cable holder positioned at a middle portion of the post.

15. The system of claim 14, wherein the visual indicator is configured to show a first color if the predetermined criteria is met, and a second color if the predetermined criteria is not met.

16. The system of claim 15, wherein the predetermined criteria is at least one of: a requisite cable deflection, requisite force is applied to the cable, or requisite force is applied to the cable tension mechanism, or a combination thereof.

17. A method of providing fall protection for an elevated flatbed platform, the method comprising the steps of:
a) installing a first end post assembly at first end of an elevated flatbed platform along a perimeter side;
b) installing a second end post assembly at a second end of the perimeter side;
c) installing at least one intermediate post between first and second end post assemblies;
d) routing a cable through a first cable holder and second cable holder within each intermediate post effective to form a top railing and a bottom railing; and e) tensioning the cable to meet minimum cable deflection requirements based at least on a visual indicator on the second end post assembly configured to show if cable tension criteria is met.

18. The method of claim 17, further comprising installing a plurality of intermediate posts.

19. The method of claim 18, further comprising releasing tension from the cable effective to allow removal of at least one intermediate post.

\* \* \* \* \*